United States Patent [19]

Stemple

[11] Patent Number: 4,581,403
[45] Date of Patent: Apr. 8, 1986

[54] ABS PLASTIC MADE TRANSPARENT AND FLAME RETARDANT WITH $BR_2$-$BR_8$ DIPHENYL ETHERS

[75] Inventor: Thomas W. Stemple, Vienna, W. Va.

[73] Assignee: Borg-Warner Chemicals, Inc., Parkersburg W.Va.

[21] Appl. No.: 713,141

[22] Filed: Mar. 18, 1985

Related U.S. Application Data

[63] Continuation-in-part of Ser. No. 625,334, Jun. 27, 1984, abandoned.

[51] Int. Cl.$^4$ .............................................. C08K 5/06
[52] U.S. Cl. ...................................................... 524/371
[58] Field of Search ................................ 524/371, 412

[56] References Cited

U.S. PATENT DOCUMENTS

| | | | |
|---|---|---|---|
| T995,004 | 6/1980 | Lawson | 524/371 |
| 3,347,822 | 10/1967 | Jenkner | 524/412 |
| 3,686,362 | 8/1972 | Hinckley et al. | 524/371 |
| 4,000,114 | 12/1976 | Gordon et al. | 524/371 |
| 4,089,912 | 5/1978 | Levek et al. | 524/180 |
| 4,144,288 | 3/1979 | Miano | 524/371 |
| 4,173,561 | 11/1979 | Tabana et al. | 524/371 |

OTHER PUBLICATIONS

Theodore E. Tabor et al. "Decabromodiphenyl Oxide-A New Fire Retardant Additive for Plastics", Fire Retardants: Proceedings of 1974 Intnl. Symposium on Flammability and Fire Retardants–May 1-2, 1974, Cornwall, Ontario, Canada, Vijay Mohan Bhatragar, editor, 1975, Technomic Pub. Co. Inc., Westport, Conn.

Primary Examiner—Veronica P. Hoke
Attorney, Agent, or Firm—Richard J. Schlott

[57] ABSTRACT

ABS resins are blended with a $Br_2$-$Br_8$ polybrominated diphenyl ether to yield an ABS resin which is flame retardant and transparent.

11 Claims, No Drawings

ABS PLASTIC MADE TRANSPARENT AND FLAME RETARDANT WITH BR$_2$–BR$_8$ DIPHENYL ETHERS

CROSS-REFERENCE TO RELATED APPLICATION

This application is a Continuation-in-Part of U.S. application Ser. No. 625,334, filed June 27, 1984 now abandoned.

BACKGROUND OF THE INVENTION

This invention relates to improved transparent and flame-retardant compositions and more specifically to transparent, flame-retardant ABS resins.

Acrylonitrile-butadiene-styrene (ABS) resins have achieved wide-spread use in the plastics field in a variety of applications for the molding of plastic articles having good impact resistance. One of the early improvements in the formulation of ABS plastics was to blend ABS resins with polyhalogenated aromatic compounds such as polybrominated diphenyl oxides to impart flame retardancy to the composition. Such compounds have frequently been used with an inorganic synergist such as antimony oxide as described in U.S. Pat. Nos. 3,347,822, 4,144,288 and 4,173,561 as well as German Pat. Nos. 2,733,695, 2,933,900 and 3,142,894.

ABS resins may generally be characterized as a dispersion of a particulate rubbery impact modifier in a rigid polymeric matrix. As such, ABS resins are normally opaque materials, and the addition of inorganic flame retarding agents and synergists would be expected to contribute toward the opaqueness. There are, however, various applications where the lack of transparency in ABS resins prevents its use. Transparency in ABS systems has heretofore been accomplished by matching the refractive index of the grafted resin component to the impact-modifying rubber substrate, either by incorporating monomers such as methylmethacrylate or methacrylonitrile in the grafted component, or by employing modified rubbery substrates such as acrylate rubber as the impact modifier. Such modifications are known to affect other physical properties including solvent resistance, and the cost and complexity of the resin is increased. A method for improving the transparency of ABS resins without requiring modification of the base resin would be a useful improvement in the compounding art.

SUMMARY OF THE INVENTION

The addition of an effective amount of at least one polybrominated diphenyl ether to ABS resins not only imparts an expected high degree of flame retardancy properties to the ABS resins, but also renders such resins substantially and unexpectedly transparent. The compositions of the present invention are thus formulated of an ABS resin and at least 25 wt% of a polybrominated diphenyl ether, preferably without inorganic fire retardancy additives, to provide both flame retardancy and transparency.

DETAILED DESCRIPTION

The polybrominated diphenyl ethers employed preferably contain up to 8 bromine atoms per molecule. Preferred are diphenyl ethers containing 2 to 8 bromine atoms per molecule and still more preferred are diphenyl ethers containing 5–8 bromine atoms per molecule. It will be understood that a single diphenyl ether can be employed, although it is equally possible to employ mixtures of brominated diphenyl ethers as well. Polyphenyl ethers which contain 9 or 10 bromine atoms have been evaluated and found to yield little or no transparency. Without limiting the invention as to theory, it is believed that the higher brominated diphenyl ethers have melting points which are too high relative to acceptable processing temperatures for ABS resins.

The amount of the brominated diphenyl ether employed to impart both transparency and flame retardancy is an amount sufficient to render the ABS resin transparent. Generally, the compositions will consist essentially of at least 25%, preferably from 25–40%, of brominated diphenyl ether, based on the weight of ABS and brominated diphenyl ether. It has been found that the higher the bromine content of the diphenyl ethers, the lower is the quantity of brominated diphenyl ether required to achieve transparency.

The ABS resins employed in the practice of this invention are generally graft copolymers of a vinyl aromatic monomer and a nitrile monomer grafted onto a backbone which is either a polybutadiene backbone or a backbone formed of a copolymer of butadiene and a vinyl aromatic monomer. The preferred vinyl aromatic monomers employed in the practice of the present invention are styrene and alphamethyl styrene, with styrene being preferred because alphamethyl styrene-based ABS systems tend to exhibit a lesser degree of transparency. The nitrile monomer is preferably acrylonitrile, although methacrylonitrile can also be used.

Typically, the ABS resins employed in the practice of the present invention have a butadiene content which ranges from 13.5 to 50% by weight based on the weight of the graft copolymer, the remainder being the vinyl aromatic monomer and the nitrile monomer. The ratio of vinyl aromatic monomer to nitrile monomer is preferably within the range of 1.5:1 to 3:1.

As indicated above, it is preferred to formulate the compositions of the present invention without the usual inorganic flame retarding agents such as antimony compounds. It has been found that antimony oxide, for example, has a negative effect on the impact strength of ABS resins and also has a negative effect on optimum transparency of the system. Metal stearates frequently used for lubrication purposes also have a negative effect on optimum transparency. However, conventional dibutyl tin maleate stabilizer, polyoxyethylene ether lubricant and dyes and pigments can be used without substantially affecting transparency.

Having described the basic concepts of the invention, reference is now made to the following examples, which are provided by way of illustration and not by way of limitation, of the practice of the invention in the preparation of transparent, flame retardant ABS compositions. Although these compositions include stabilizer and lubricant, all calculations are based only on resin and polybrominated diphenyl ether.

EXAMPLE 1

This example illustrates the effect of various levels of polybrominated diphenyl ethers on transparency of an ABS resin. The particular resin employed in the example is Blendex ®201 ABS marketed by Borg-Warner Chemicals.

The ABS resin was formulated with various amounts of octabromodiphenyl ether, a polybrominated diphenyl ether containing 8 bromine atoms per molecule, by melt-mixing in a Banbury mixer at a stock temperature of 330°–350° F. The cooled resin was pelletized and injected-molded on a Van Dorn 3 oz. injection molding machine to form placs having thicknesses of 1/16", 1/8" and 1/4".

The results of the test are shown in the following table:

TABLE 1

| Br8 Content wt % | Transparency @1/16" | @1/8" | @1/4" |
| --- | --- | --- | --- |
| 0 | Very slight | None | None |
| 16.6 | Slight | Very slight | None |
| 20 | Slight | Very slight | None |
| 23.1 | Moderate | Slight | None |
| 25.9 | Good | Moderate | Very slight |
| 28.6 | Good | Moderate | Slight |
| 31.0 | Good | Good | Moderate |
| 33.3 | Good | Good | Moderate |

Notes:
The compositions comprise Blendex 201 ABS resin and octabromodiphenyl ether ($Br_8$).

EXAMPLE 2

This example illustrates the transparency of blends consisting of 31% by weight of octabromodiphenyl, a polybrominated diphenyl ether containing 8 bromine atoms per molecule, with various Blendex ABS resins whose butadiene levels range from 13.5 to 50%, the styrene to acrylonitrile ratios ranging from 1.8:1 to 3:1. The ABS resins are not transparent when molded without the bromine-containing additive at 1/16" thickness. The compositions, summarized in Table 2 together with the transparency data, were prepared substantially by the procedure of Example 1.

TABLE 2

| ABS | Transparency @1/16" | @1/8" | @1/4" |
| --- | --- | --- | --- |
| 101 | Moderate | Slight | Very slight |
| 111 | Moderate | Moderate | Slight |
| 133 | Slight | Very slight | None |
| 211 | Good | Good | Moderate |
| 215 | Good | Good | Moderate |
| 216 | Good | Good | Moderate |
| 310 | Moderate | Slight | Very slight |
| 601 | Good | Moderate | None |
| 608 | Good | Good | Moderate |
| 631 | Good | Good | Moderate |
| 702 | Moderate | Slight | None |
| 703 | Slight | Very slight | None |

Notes:
Resin blends consist of 69 wt % of the indicated ABS and 31 wt % octabromodiphenyl ether.

EXAMPLE 3

Selected blends from Example 2 were injection-molded and tested to determine physical and flammability properties. The results of those tests are shown in the following table:

TABLE 3

| | Resin | | | | | | | | |
| --- | --- | --- | --- | --- | --- | --- | --- | --- | --- |
| | 211 | 111 | 101 | 215 | 216 | 608 | 631 | 702 | 201 |
| $Br_8$ wt % | 31 | 31 | 31 | 31 | 31 | 31 | 31 | 31 | 31 |
| ABS wt % | 69 | 69 | 69 | 69 | 69 | 69 | 69 | 69 | 69 |
| Izod Impact (IM)[1] | 6.0 | 7.9 | 8.3 | 9.2 | 8.3 | 2.4 | 2.3 | 0.5 | 7.3 |
| Tensile Strength[2] | 6715 | 4790 | 4900 | 6523 | 6290 | 7980 | 7640 | 7700 | 6820 |
| Elongation[3] | 17 | 71 | 70 | 29 | 27 | 13 | 12 | 6 | 21 |
| Tensile Modulus[4] | 3.0 | 2.3 | 2.4 | 3.0 | 2.9 | 3.6 | 3.7 | 4.0 | 3.0 |
| Flexural Modulus[5] | 3.7 | 2.9 | 2.8 | 3.7 | 3.4 | 4.3 | 4.5 | 4.9 | 3.7 |
| Flexural Strength | 11880 | 8470 | 8440 | 10985 | 10750 | 13670 | 13600 | 14860 | 11490 |
| Heat Deflection[6] | 154 | 151 | 152 | 157 | 155 | 161 | 160 | 166 | 157 |
| UL94 Flamm. (1.8") | V-0 | V-1 | V-1 | V-0 | V-0 | V-0 | V-0 | V-0 | V-0 |
| Ave. Burn Time | 1.0 | 7.9 | 3.3 | 1.4 | 1.4 | 1.1 | 1.0 | 1.7 | 1.1 |
| Max. Burn Time | 1 | 19 | 19 | 2 | 2 | 2 | 1 | 3 | 2 |
| 1/16" Transp. | Good | Mod. | Mod. | Good | Good | Good | Good | Mod. | Good |

Notes:
Mechanical properties listed above are determined in accordance with ASTM D638.
[1]Expressed in ft.-lb./inch.
[2]Expressed in psi.
[3]Expressed in %.
[4]Expressed in psi × $10^{-5}$.
[5]Expressed in psi × $10^{-5}$.
[6]Expressed in °F.

EXAMPLE 4

This example illustrates the variability in transparency resulting from the use of different polybrominated diphenyl ethers containing from 2 bromine atoms ($Br_2$) to 10 bromine atoms ($Br_{10}$) per molecule. Compositions consisting of the indicated polybromodiphenyl ether and Blendex 201 ABS resin were prepared as in Example 1 and molded into test specimens. The transparency data for each are summarized in Table 4.

TABLE 4

| $Br_x$ | wt % | Transparency @1/16" | @1/8" | @1/4" |
| --- | --- | --- | --- | --- |
| $Br_2$ | 31.0 | Moderate | Very slight | None |
| $Br_4$ | 31.0 | Moderate | Very slight | None |
| $Br_5$ | 31.0 | Moderate | Slight | None |
| | 39.4 | Good | Good | Moderate |
| $Br_6$ | 31.0 | Good | Good | Moderate |
| $Br_9$ | 31.0 | Very slight | None | None |
| $Br_8$* | 39.4 | Moderate | Slight | None |
| $Br_{10}$* | 39.4 | None | None | None |

Note:
First six compositions consist of Blendex 201 ABS resin and indicated polybrominated diphenyl ether. $Br_8$* and $Br_{10}$* compositions consist of Blendex 133 ABS resin.

It will be apparent from the data in Table 4, that polybrominated diphenyl ethers containing from 2 to 8 bromine atoms per molecule are useful in imparting transparency to ABS resins. Nonabromodiphenyl ether ($Br_9$) and decabromodiphenyl ether ($Br_{10}$) are ineffective, even at levels approaching 40 wt%.

It is therefore surprising that transparency will be imparted to ABS by diphenyl ether compounds having from 2 to 8 bromine atoms per molecule, particularly in view of the fact that the corresponding well-known flame retardant diphenyl ether compounds having 9 or 10 bromine atoms per molecule are not effective in this regard.

It will thus be apparent that the instant invention is a transparent ABS composition consisting essentially of an ABS resin and a polybrominated diphenyl ether in an amount effective to impart transparency and a method for preparing transparent ABS compositions. Compositions having at least 25 wt% polybrominated diphenyl ether with from 2 to 8, preferably from 5 to 8, bromine atoms per molecule are surprisingly transparent, and are flame retardant. It will be understood that various changes and modifications can be made in the details of procedure, formulation and use without departing from the spirit of the invention, especially as defined in the following claims.

I claim:

1. A transparent, flame retardant composition consisting essentially of
   (a) a graft copolymer of a vinyl aromatic monomer and a nitrile monomer on a backbone selected from the group consisting of a polybutadiene and a butadienevinyl aromatic copolymer, and
   (b) from 25 to 40% by weight based on the weight of the final composition of a polybrominated diphenyl ether containing up to 8 bromine atoms.

2. A composition as defined in claim 1 wherein the polybrominated diphenyl ether contains 2 to 8 bromine atoms.

3. A composition as defined in claim 1 wherein the butadiene content of the graft copolymer is within the range of 13.5 to 50%.

4. A composition as defined in claim 1 wherein the graft copolymer has a vinyl aromatic monomer to nitrile monomer ratio of about 1.5:1 to 3:1.

5. A composition as defined in claim 1 wherein the vinyl aromatic monomer is selected from the group consisting of styrene and alphamethyl styrene.

6. A composition as defined in claim 1 wherein the nitrile monomer is selected from the group consisting of acrylonitrile and methacrylonitrile.

7. A composition as defined in claim 1 wherein the vinyl aromatic monomer is styrene and the nitrile monomer is acrylonitrile.

8. A method for imparting transparency and flame retardancy to a graft copolymer comprising blending with
   (a) a graft copolymer of a vinyl aromatic monomer and a nitrile monomer on a backbone selected from the group consisting of a polybutadiene and a butadienevinyl aromatic copolymer, and
   (b) from 25 to 40% by weight based on the weight of the final composition of a polybrominated diphenyl ether containing up to 8 bromine atoms.

9. A method as defined in claim 8 wherein the butadiene content of the graft copolymer is within the range of 13.5 to 50%.

10. A method as defined in claim 8 wherein the graft copolymer has a vinyl aromatic monomer to nitrile monomer ratio of about 1.5:1 to 3:1.

11. A method as defined in claim 8 wherein the vinyl aromatic monomer is styrene and the nitrile monomer is acrylonitrile.

* * * * *